(12) United States Patent
Sostmann et al.

(10) Patent No.: US 8,377,347 B2
(45) Date of Patent: Feb. 19, 2013

(54) MOLDED SKIN WITH ELECTROLUMINESCENT ELEMENTS

(75) Inventors: Stefan Sostmann, Langenhagen (DE); Christian Seidel, Hannover (DE)

(73) Assignee: Johnson Controls Interiors GmbH & Co. KG, Grefrath (DE)

( * ) Notice: Subject to any disclaimer, the term of this patent is extended or adjusted under 35 U.S.C. 154(b) by 97 days.

(21) Appl. No.: 13/036,374

(22) Filed: Feb. 28, 2011

(65) Prior Publication Data
US 2011/0227240 A1  Sep. 22, 2011

Related U.S. Application Data

(63) Continuation of application No. PCT/EP2009/057070, filed on Jun. 9, 2009.

(30) Foreign Application Priority Data

Aug. 29, 2008 (DE) .......................... 10 2008 045 015

(51) Int. Cl.
*C09K 8/86* (2006.01)
(52) U.S. Cl. .......... 264/21; 264/248; 264/254; 264/255; 264/259; 264/308; 264/310; 264/331.15
(58) Field of Classification Search ............ 264/21, 264/248, 254, 255, 259, 308, 310, 331.15
See application file for complete search history.

(56) References Cited

U.S. PATENT DOCUMENTS

| | | | | |
|---|---|---|---|---|
| 5,269,559 A * | 12/1993 | Filion et al. | ................. | 280/728.3 |
| 5,469,020 A * | 11/1995 | Herrick | .......................... | 313/511 |
| 5,577,319 A * | 11/1996 | Knecht | .......................... | 29/827 |
| 6,371,548 B1 * | 4/2002 | Misaras | ...................... | 296/146.7 |
| 6,949,709 B1 * | 9/2005 | Barat et al. | ...................... | 174/255 |
| 7,158,111 B1 * | 1/2007 | Jackson et al. | ................. | 345/107 |
| 7,192,543 B2 * | 3/2007 | Malfliet et al. | ............... | 264/45.5 |
| 7,759,264 B2 * | 7/2010 | Braun et al. | ...................... | 442/6 |
| 7,845,836 B2 * | 12/2010 | Okuda | .......................... | 362/488 |
| 2002/0108698 A1 * | 8/2002 | Spoerle | .......................... | 156/153 |
| 2003/0180498 A1 * | 9/2003 | De Winter et al. | .............. | 428/67 |
| 2005/0025994 A1 * | 2/2005 | Hanna et al. | ................... | 428/690 |
| 2006/0067083 A1 * | 3/2006 | Bogdan et al. | ................. | 362/488 |
| 2006/0284330 A1 * | 12/2006 | De Winter et al. | ........... | 264/46.5 |
| 2007/0151835 A1 * | 7/2007 | Rakers et al. | .................. | 200/313 |
| 2008/0220678 A1 * | 9/2008 | Neudeck et al. | .............. | 442/110 |
| 2008/0290683 A1 * | 11/2008 | Ohlinger et al. | .............. | 296/39.1 |
| 2011/0091705 A1 * | 4/2011 | Shih et al. | ...................... | 428/220 |
| 2012/0126441 A1 * | 5/2012 | Nowak | ............................. | 264/21 |

FOREIGN PATENT DOCUMENTS

| CA | 2 454 911 A1 | 2/2003 |
|---|---|---|
| DE | 10 2005 038 680 A1 | 2/2006 |
| GB | 2 418 651 A | 4/2006 |

* cited by examiner

*Primary Examiner* — Christina Johnson
*Assistant Examiner* — Saeed Huda
(74) *Attorney, Agent, or Firm* — Walter Ottesen, P.A.

(57) ABSTRACT

The invention relates to a method for producing an out of tool molded skin (1) with an embedded flat electroluminescent element, wherein an outer function or carrier layer of the electroluminescent element (5, 6, 7, 8) is made of plastic material that is substantially identical to the powdered plastic material of the molded skin and is applied to the not yet fully cured and cooled molded skin.

15 Claims, 2 Drawing Sheets

MOLDED SKIN WITH ELECTROLUMINESCENT ELEMENTS

CROSS REFERENCE TO RELATED APPLICATIONS

This application is a continuation application of international patent application PCT/EP 2009/057070, filed Jun. 9, 2009, designating the United States and claiming priority from German application 10 2008 045 015.4, filed Aug. 29, 2008, and the entire content of both applications is incorporated herein by reference.

FIELD OF THE INVENTION

The invention relates to a method of producing an out of tool molded skin as a surface covering of coated objects, in which a powdered plastic material is placed in a tool mold or reaction mold and is melted on in the mold in a sintering method, preferably by rotational sintering, whereby the molded skin comprises at least one planar electroluminescent element comprising a plurality of functional and/or carrier layers, wherein the electroluminescent element is embedded in the molded skin and/or is coated with the molded skin.

BACKGROUND OF THE INVENTION

Grained, patterned, or finely structured plastic skins forming surfaces for objects are widely known and are used for example for the interior trim in motor vehicles, often in the form of relatively soft, underfoamed films with a pleasing feel, for instance for the trim of dashboards or the interior shells of doors, et cetera. With appropriate adaption in terms of strength and design, such films are of course also used for other articles that are provided with a high-quality coating.

There are various methods known in the art for producing such plastic skins, for example rolling and/or embossing methods for producing "endless" film webs of thermoplastic material, or methods for producing individual out of tool molded skins, that is to say plastic moldings.

In the case of the rolling and embossing methods, an embossing roller is used to provide a thermoplastic film in the form of a web with a three-dimensionally structured, embossed surface, that is to say for instance a grained "leather surface."

Out of tool molded skins in this context refer to more or less rigid plastic moldings which, for example, are produced in molds by various sintering or spraying processes, and in the case of which one or more liquid or powdered components are introduced into a mold and react/cure there. Out of tool molded skins are consequently also created by rotational sintering, for example by methods for producing so-called slush skins.

In the case of these out of tool methods there is also the possibility of determining the surface structure/texture, that is, the surface of the plastic skin, that is to say for example the appearance of a grain effect, and the geometry of the entire component in a single molding process during production. For this purpose, for example, the grained structure and component geometry are introduced as a negative into a mold, the plastic skin is shaped by sintering or spraying processes and then the molded skin is removed.

Both the web material and the molded skins are generally provided on the rear side with a layer of plastic foam, either after the embossing and/or after bringing and thermoforming them into the component mold (web material) or already in the tool mold in which the plastic skin was produced (molded skins). Of course, other methods of foam coating, such as for instance brushing methods, are known. By this subsequent "foam backing," an already quite rigid three-dimensionally shaped component is obtained. Foam backing here represents only one possible way of forming a support structure for the plastic skin. Also known for instance is the adhesive attachment of supporting structural elements made of hard plastic.

U.S. Pat. No. 7,192,543 describes a method for producing out of tool melted/molded articles, such as for instance dashboards, door panels, or glove compartments, in which a divided lower mold is first, and at least partially, lined with a flexible film, which covers over the seams that are present in the mold, and which has on its inner side a grain effect, for example a leather texture. A reactive mixture is sprayed onto the flexible film and then forms the outer skin of the component, before further reinforcements or layers of foam are applied by various spraying or melt-molding methods.

After the production process, the molded skins with the support structure are usually given a clean finish, that is, any edges of skin are cut off and, in the case of dashboards, for example, the necessary recesses or holes for instruments, switches, decorative strips, radios, lighting means, et cetera are produced. After that, for example, all the switches and lighting means are individually fitted into the dashboard and wired or provided with connecting lines, which can then be connected when they are installed in the vehicle. The same applies to the installation of instruments, loudspeakers, and the like. Decorative strips and mountings must likewise also be attached.

Altogether, therefore, considerable effort, a series of time-consuming and cost-intensive production steps, and logistical planning are still required before a ready-to-install dashboard, a door insert, or similar components with functional elements are passed on to the plant carrying out further processing, that is to the vehicle manufacturer.

To minimize this production expenditure, it has been proposed to connect, that is, essentially to coat or laminate, electric conductors or thin film circuits, that is, films provided with thin vaporized or affixed metallic conductors, directly to the rear side of the molded skins or films before or after the foam backing.

In particular, in the inclusion of conductors for illuminants, which due to the required current rating have to be designed relatively "thick", there arises the problem that when joining the two different materials (molded skins or films and conductors) the surface of decorative design, that is, the surface of the plastic skin which is visible from outside, is damaged by the contact pressure.

Furthermore, "thick" conductors will leave marks on the surface of the decorative design if they are laminated at temperatures that are too high and if they are laminated to one another, with the shrinkage of the materials being different, and subsequently cool down at different rates.

Furthermore, there exists the problem that the molded skins or films and the conductors have different heat expansion coefficients when stored in heat, and thus a second conductor which might have been laminated behind the surface of the decorating design becomes visible.

In addition, there exists the problem that certain areas of the surfaces, especially in the case of surfaces that are produced by the slush process (rotational sintering), cause kinks during demolding due to their different degrees of rigidity.

It has been proposed already to apply electroluminescent elements or layers in or on components and/or lining parts for the interior of motor vehicles.

For instance, CA 2 454 911 A1 discloses a roof lining as a molding, which is provided with strip-shaped electroluminescent elements. The roof lining consists of a molded carrier which is grouted with a coating film to form a component. Prior to grouting, the electroluminescent elements are positioned in the carrier, passed with their connecting cables through the carrier, and are subsequently covered, fixed, and grouted with the applied coating film. The various necessary positioning and pressing steps in the tools required for this purpose prove to be disadvantageous. In addition, in this embodiment the electroluminescent elements can also become visible behind the surface of the decorative design/coating film.

DE 10 2005 038 680 A1 discloses a component of a motor vehicle having a three-dimensional surface which comprises an electroluminescent layer and is back-injection-molded with a thermoplastic plastic material in order to fix the component mold. Thus, essentially smaller non-flexible illuminants such as illuminated push-buttons or luminous elements are produced. The production of larger parts is rather difficult by this embodiment.

SUMMARY OF THE INVENTION

Therefore, the object of the invention is to provide a method of producing a plastic skin with electroluminescent elements, which method, on the one hand, minimizes complex production steps, can easily be used in existing production processes and systems, is applicable for all lining components and design sizes and, on the other hand, combines a good component integration with a pleasant appearance of the plastic skin.

The method of the invention is for producing an out of tool molded skin as a surface covering of coated objects. The method includes the steps of: placing a powdered plastic material in a tool mold or reaction mold; melting the powdered plastic material by a sintering method to form a molded skin; and, embedding a planar electroluminescent element comprising a plurality of layers selected from the group consisting of function layer and carrier layer into the molded skin or coating the planar electroluminescent element with the molded skin, wherein a plastic material of an outer layer of the plurality of layers of the planar electroluminescent element is substantially identical to the powdered plastic material; and, wherein the embedding of the planar electroluminescent element or the coating of the planar electroluminescent element is performed before a curing or a cooling down of the molded skin is completed.

In this context, an outer function or carrier layer of the electroluminescent element is manufactured by using a plastic material which is essentially identical with the powdered plastic material of the skin. The electroluminescent element with this outer function or carrier layer is applied to the not yet fully cured and cooled molded skin and is combined with the latter.

Thus, the solution according to the invention combines and connects the material and the process of plastic skin production by sintering or rotational sintering with the production process of the electroluminescent elements (EL elements). The material of the plastic skins, mostly polyvinyl chloride (PVC), thermoplastic polyurethane (TPU), or thermoplastic polyethylene can serve as lamination or protection of the layers of the electroluminescent elements. As a result, the actual carrier of the EL element has the same material properties as the plastic skin, and any tracing of the EL elements can be avoided.

Electroluminescence, in this case the luminous phenomenon of electroluminescent elements as luminescent films, occurs whenever an electroluminescent-active luminous matter is subjected to an electric alternating field which causes it to glow. Typically, electroluminescent elements consist of a luminescent pigment layer, usually of zinc sulfide pigments, a dielectric layer, frequently of barium titanate, and a front electrode and a back electrode. The back electrode typically consists of a mixture of silver and an intrinsically conductive polymer, and the front electrode consists of a conductive and transparent material (mostly also intrinsically conductive polymers). The four components are each available in different paste binder systems and can be processed to EL luminescent elements in standard printing methods (for example, screen printing).

Alternating voltage is usually required to activate the EL luminescent elements. Frequently, alternating voltages of about 100 V are used, which generally requires the EL elements to be laminated with thermoplastic carriers for reasons of safety. These carriers also shield the luminescent elements from external influences such as, for example, moisture. Obviously, depending on the construction of electroluminescent elements, alternating voltages of a higher or lower voltage are likewise suitable for activation.

In a preferred embodiment of the method, the electroluminescent element with an outer function or carrier layer made of the same plastic material as that of the molded skin initially is produced separately and subsequently applied sequentially as a multilayer film on the not yet fully cured and hardened molded skin which is still located in the tool mold, and is melted together with the latter, whereby in particular a first and particularly suitable type of method consists in that the various layers of the electroluminescent element are applied on a base film made of the same plastic material as the one used also for the molded skin.

The various layers of the EL elements are printed on a prepared thin layer (film) of the material, such as is also used for the typical plastic skin production methods, for example, in the case of the out of tool sintering method. This can be done in the screen printing method or by other common printing methods using commercially available EL pastes. These prepared EL carriers can be easily integrated in the production process by being applied on the still hot skin upon opening the tool mold/electroformed mold (in the out of tool production process). Thus, the EL carrier of the plastic skin is melted together with the plastic skin and an embedded/integrated EL element is formed.

In another preferred embodiment of the method, the various layers of the electroluminescent element are applied one after the other on the not yet fully cured molded skin still located in the tool mold and are connected therewith. In this alternative, upon opening of the electroformed mold, the various layers of the EL element can be printed directly on the inner layer of the moled skin by means of printing methods and an industrial robot, whereby as a further preferred embodiment of the method, after application of the electroluminescent element, the latter is covered with a varnish or a layer of plastic material, preferably a plastic material such as the one of the molded skin. Thus, a good and complete inclusion of the electroluminescent element in the molded skin is achieved.

In yet another preferred embodiment of the method, the molded skin still located in the tool mold is cooled down to at least 110° C. At such a temperature, both the application of an electroluminescent element produced separately and the imprint on the inner layer of the plastic skin are possible without any problems.

In another preferred embodiment of the method, the various layers are produced one after the other by means of printing methods and/or by the application of paste systems.

The connection between the electroluminescent element and the plastic skin may of course be effected by plasticization of the connecting boundaries, for example, by the addition of solvents or by bonding.

In yet another preferred embodiment of the method, diffusion-tight layer is provided between the electroluminescent element and the plastic skin. Thereby, any undesired diffusion of plasticizers or solvents into the layers of the electroluminescent element is prevented.

In another preferred embodiment of the method, a layer is provided between the electroluminescent element and the plastic skin, which layer prevents a halogenation reaction between the molded skin and the electroluminescent element, that is to say the penetration of chlorine compounds, which may be contained in PVC.

In another preferred embodiment of the method, the molded skin is foam-backed after the application of the electroluminescent element, thus producing a compact molded skin with a pleasant touch in a simple manner.

In a further preferred embodiment of the method, the plastic material of the molded skin is produced with such a low pigmentation that the molded skin is translucent for the electroluminescent element. As a result, no further covers, holes, or recesses in the molded skin are necessary which otherwise would be needed for light to shine through. Further, sectional pigment reductions which are designed either geometrically or in the form of letterings or logos open up undreamed-of possibilities, for instance, the possibility of letting brands or letterings "shine through the skin."

Advantageously, the plastic material is polyvinyl chloride (PVC), which, with respect to the sintering method, has a particularly good processability in relation to the mechanical strength properties of the plastic skin.

Typically, the electroluminescent elements are disposed on or near the back side of the plastic skin. This also facilitates the production in the case of complicated plastic skin shapes.

As a result, the method according to the invention is particularly suited for the production of a molded skin as surface coating, for a lining component for the interior of a motor vehicle, for example, for a dashboard on which luminescent areas, letterings, logos, warnings, or information "appear." Such functional electroluminescent elements in the molded skin eliminate the alternative assembly of separate switches, sensors, luminescent elements, et cetera, which in turn would have to be connected securely as individual elements to the electroluminescent elements and would have to be provided with a plurality of connecting cables.

The molded skin produced in this manner is also particularly suited for the application as a cover fabric for the interior door and roof lining or of a motor vehicle, in' which illuminating signals or signal elements are integrated in the molded skin.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
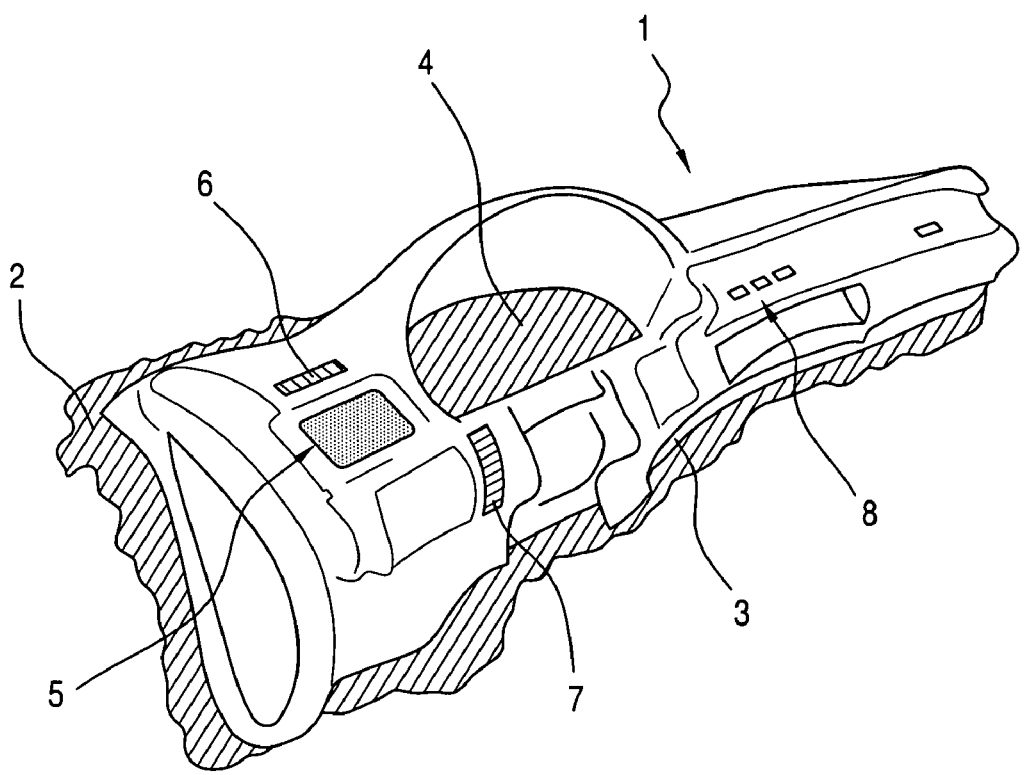
FIG. 1 shows a molded skin produced in accordance with the method according to the invention; and, FIG. 2 shows the construction of an electroluminescent element produced separately and integrated in the molded skin.

FIG. 1 shows a molded skin 1 produced in accordance with the method according to the invention, namely a so-called slush skin for the dashboard of a motor vehicle, such as is produced according to the rotational sintering method. As a result, the contour of the dashboard is distinctly configured so that the molded skin can easily be applied to a correspondingly adapted reinforcing sub-construction, a so-called carrier.

The shaded areas (2, 3) of the molded skin pertain to excess mold edges to be removed in the finishing process. The shaded area 4 is likewise cut out in the finishing process and subsequently forms the recess for the display instruments to be inserted later on.

Embedded in the molded skin are electroluminescent elements for illuminating and signal-transmitting elements 5, 6, 7, and 8, namely for the illuminating element 5, for the signal and information elements 6 and 7 serving as control lamps, and for the "translucently illuminated" lettering 8 forming the manufacturer name and the type designation of the motor vehicle. All of these electroluminescent elements contact strip conductors and/or connections on the back side of the molded skin and, during the dashboard assembly, can be connected directly to the on-board electrical system and/or to the control devices of the motor vehicle.

Figure 2:
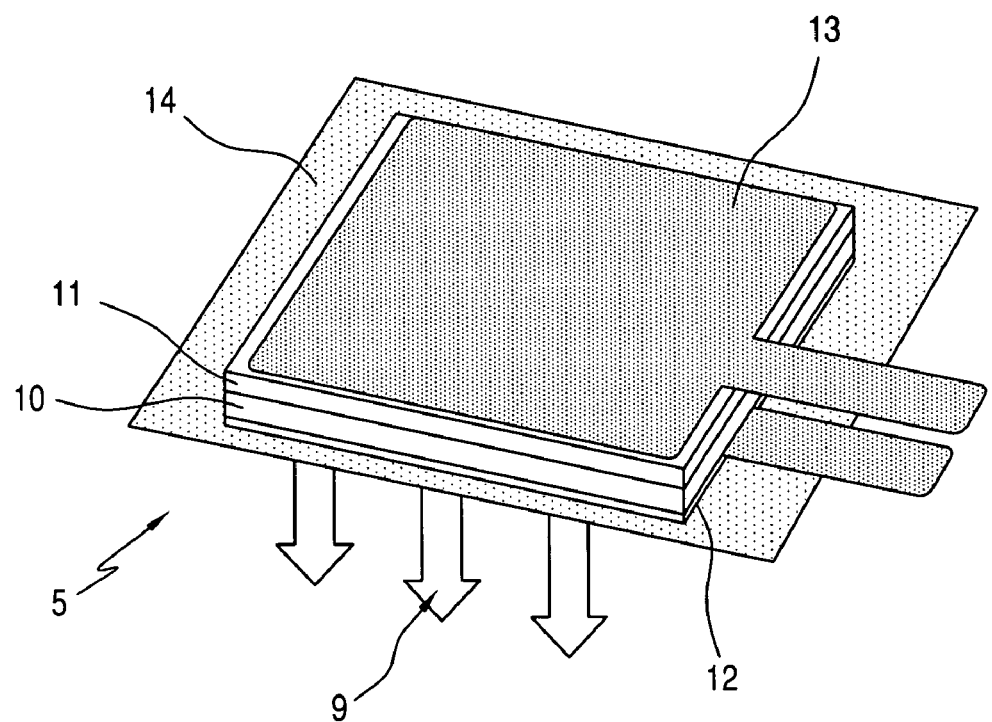

FIG. 2 shows the typical construction of the electroluminescent element 5 integrated in the molded skin produced according to the method of the invention and produced separately, which element is embedded in the molded skin in the vicinity of the back side of the molded skin and shines through the molded skin in the direction of the arrows 9. The electroluminescent element 5 consists of a luminescent pigment layer 10 of highly active zinc sulfide pigments, a dielectric layer 11 of barium titanate, and front and back electrodes 12 and 13, and a carrier layer 14. The back electrode 13 consists of a mixture of silver and an intrinsically conductive polymer. The front electrode 12 consists of a conductive and transparent, intrinsically conductive polymer. The bottom layer 14 in this case consists of a plastic which is essentially identical to the powdered plastic material of the molded skin, whereby the carrier layer is almost transparent. The electroluminescent element is applied with the carrier layer 14 on the not yet fully cured and cooled molded skin and it is connected therewith. To activate the illuminating effect an alternating voltage of 48 Volt is applied to the electrodes 12 and 13.

In another embodiment, the carrier layer may also be on top and can be connected to the plastic skin for example with its edge projecting beyond the other layers, so that the remaining layers 10, 11, 12, and 13 of the electroluminescent element lie between the carrier layer 14 and the plastic skin. Thus, no additional cover is needed.

It is understood that the foregoing description is that of the preferred embodiments of the invention and that various changes and modifications may be made thereto without departing from the spirit and scope of the invention as defined in the appended claims.

List Of Reference Numerals
(Part of the Description)
1 Molded skin
2 Excess mold edge
3 Excess mold edge
4 Recess
5 Electroluminescent element as illuminating element
6 Electroluminescent elements as control lamps
7 Electroluminescent elements as control lamps
8 Electroluminescent element as lettering
9 Direction of illumination/light emission
10 Illuminating pigment layer
11 Dielectric layer
12 Front electrode 13 Back electrode
14 Carrier layer

What is claimed is:

1. A method of producing an out of tool molded skin as a surface covering of coated objects, the method comprising the steps of:
    placing a powdered plastic material in a tool mold or reaction mold;
    melting the powdered plastic material by a sintering method to form a molded skin; and,
    embedding a planar electroluminescent element comprising a plurality of layers selected from the group consisting of function layer and carrier layer into the molded skin or coating the planar electroluminescent element with the molded skin, wherein a plastic material of an outer layer of the plurality of layers of the planar electroluminescent element is substantially identical to the powdered plastic material; and,
    wherein the embedding of the planar electroluminescent element or the coating of the planar electroluminescent element is performed before a curing or a cooling down of the molded skin is completed.

2. The method according to claim 1, further comprising the steps of:
    forming the planar electroluminescent element having the outer function layer or the outer carrier layer separately;
    placing the planar electroluminescent element adjacent to the molded skin before the curing or the cooling down of the molded skin is completed while the molded skin is still in the tool mold; and,
    fusing the planar electroluminescent element to the molded skin.

3. The method according to claim 2, wherein the plurality of layers are provided on a base foil, and wherein the base foil is made from the same plastic material as the powdered plastic material.

4. The method according to claim 2, wherein the placing the planar electroluminescent element adjacent to the molded skin before the curing or the cooling down of the molded skin is completed comprises providing the plurality of layers sequentially.

5. The method according to claim 4, wherein the molded skin still in the tool mold is cooled down to a temperature of at least 110° C.

6. The method according to claim 3, wherein the plurality of layers are provided sequentially by printing.

7. The method according to claim 3, wherein the plurality of layers are provided sequentially by applying a paste system.

8. The method according to claim 1, further comprising providing a diffusion-tight layer between the planar electroluminescent element and the molded skin.

9. The method according to claim 1, further comprising the step of providing a layer for preventing a halogenation reaction between the planar electroluminescent element and the molded skin.

10. The method according to claim 1, further comprising the step of providing a varnish or a plastic material layer on the planar electroluminescent element after the embedding or the coating.

11. The method according to claim 1, further comprising foam-backing the planar electroluminescent element after the embedding or the coating.

12. The method according to claim 1, further comprising the step of providing a low content of a pigment in the powdered plastic material in an area of the molded skin adjacent to the planar electroluminescent element; and,
    wherein the area of the molded skin is translucent.

13. The method according to claim 1, wherein the molded skin is polyvinylchloride (PVC).

14. The method according to claim 1, wherein the sintering method is rotation sintering.

15. The method according to claim 10, wherein the plastic material layer is made from the same material as the powdered plastic material.

* * * * *